(12) United States Patent
Lotterman et al.

(10) Patent No.: US 11,652,393 B2
(45) Date of Patent: May 16, 2023

(54) ROTOR ASSEMBLY FOR ELECTRIC MOTOR OF TURBOMACHINE WITH CARBON-CARBON COMPOSITE MAGNET-RETAINING JACKET MEMBER

(71) Applicant: Garrett Transportation I Inc, Torrance, CA (US)

(72) Inventors: Jeffrey Lotterman, Los Angeles, CA (US); Todd Ratke, Corona, CA (US); Sushank Singampalli, Lakewood, CA (US); Antoine Costeux, Golbey (FR); Carlos Chavez Castellanos, Rolling Hill Estates, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 151 days.

(21) Appl. No.: 16/917,976

(22) Filed: Jul. 1, 2020

(65) Prior Publication Data
US 2022/0006369 A1   Jan. 6, 2022

(51) Int. Cl.
| | |
|---|---|
| H02K 15/12 | (2006.01) |
| H02K 1/2706 | (2022.01) |
| H02K 1/30 | (2006.01) |
| H02K 5/128 | (2006.01) |
| H02K 15/02 | (2006.01) |
| F04D 13/06 | (2006.01) |

(52) U.S. Cl.
CPC ............ *H02K 15/12* (2013.01); *F04D 13/06* (2013.01); *H02K 1/2706* (2013.01); *H02K 1/30* (2013.01); *H02K 5/128* (2013.01); *H02K 15/02* (2013.01)

(58) Field of Classification Search
CPC ........... H02K 15/12; H02K 1/30; H02K 5/128
USPC ............ 310/156.01, 156.19, 156.27, 156.31
See application file for complete search history.

(56) References Cited

U.S. PATENT DOCUMENTS

| | | | |
|---|---|---|---|
| 4,930,201 A * | 6/1990 | Brown | H02K 1/278 310/156.28 |
| 5,126,612 A * | 6/1992 | Girault | F16C 32/0402 310/90 |
| 6,047,461 A | 4/2000 | Wilson | |
| 2008/0088195 A1 | 4/2008 | Dooley et al. | |
| 2010/0019589 A1 | 1/2010 | Saban et al. | |

(Continued)

FOREIGN PATENT DOCUMENTS

| | | | | |
|---|---|---|---|---|
| CA | 3062064 A1 * | 11/2018 | | H02K 1/32 |
| DE | 102014000983 A1 * | 7/2015 | | F04D 25/06 |
| EP | 3249786 A1 | 11/2017 | | |

(Continued)

*Primary Examiner* — Jose A Gonzalez Quinones
(74) *Attorney, Agent, or Firm* — Lorenz & Kopf, LLP

(57) ABSTRACT

A rotor assembly for an electric motor for a turbomachine defines an axis of rotation. The rotor assembly includes a jacket member that is hollow and that defines an inner radial surface facing inwardly toward the axis of rotation. Furthermore, the rotor assembly includes a magnet member that is received within the jacket member. The magnet member includes an outer radial surface facing outwardly from the axis of rotation. The jacket member is made of a sintered composite material having carbon filament and a sintered matrix. Additionally, the inner radial surface of the jacket member abuts against the outer radial surface of the magnet member to retain the magnet member in a radial position relative to the axis.

18 Claims, 5 Drawing Sheets

(56) References Cited

U.S. PATENT DOCUMENTS

2018/0069451 A1* 3/2018 Garrard .................... H02K 1/02
2019/0238016 A1* 8/2019 Paweletz ................. F04D 29/18

FOREIGN PATENT DOCUMENTS

| GB | 2511574 A | * | 9/2014 | ........... H01F 13/003 |
| JP | 2006320135 A | | 11/2006 | |
| JP | 2015195702 A | * | 11/2015 | ............... H02K 1/27 |
| JP | 2015195702 A | | 11/2015 | |
| JP | 2017051033 A | | 3/2017 | |
| JP | 2020005449 A | * | 1/2020 | |
| JP | 2020005449 A | | 1/2020 | |
| JP | 2020005451 A | | 1/2020 | |

* cited by examiner

ROTOR ASSEMBLY FOR ELECTRIC MOTOR OF TURBOMACHINE WITH CARBON-CARBON COMPOSITE MAGNET-RETAINING JACKET MEMBER

TECHNICAL FIELD

The present disclosure generally relates to a rotor assembly and, more particularly, to a rotor assembly for an electric motor of a compressor device with a carbon-carbon composite magnet-retaining jacket member.

BACKGROUND

Electric machines, such as electric motors, can be used in a variety of applications. For example, some compressor devices and other turbomachines include permanent magnet electric motors for driving rotation of the rotor shaft. These motors provide high efficiency operation as well as other advantages.

However, many rotor assemblies of these electric machines have deficiencies. Conventional rotor assemblies may not be strong or robust enough to keep the permanent magnets fixed in place on the rotor. In high speed, high power, permanent magnet electric machines, high centrifugal forces may cause components of the rotor (including the magnets) to shift, increasing unbalance of the rotor assembly, causing premature wear, etc. Also, the rotor assembly may degrade due to chemical exposure, leading to fatigue, wear, shortened operating life, etc. Furthermore, the thermal properties and temperature limits of the rotor assembly may be insufficient for some uses. Additionally, manufacturing these rotor assemblies and motors may be highly complex, labor-intensive, and/or otherwise inefficient. Typically, parts are held to relatively high tolerances, which increases manufacturing complexity and cost.

Thus, it is desirable to provide a high-quality permanent magnet electric motor that has features making it stronger and more robust than conventional motors. Furthermore, there is a need for a motor that is less sensitive to chemical exposure, high temperature operation, etc. There is also a need for a motor that provides manufacturing efficiencies. Other desirable features and characteristics of the present disclosure will become apparent from the subsequent detailed description and the appended claims, taken in conjunction with the accompanying drawings and this background discussion.

BRIEF SUMMARY

In one embodiment, a rotor assembly for an electric motor for a turbomachine that defines an axis of rotation is disclosed. The rotor assembly includes a jacket member that is hollow and that defines an inner radial surface facing inwardly toward the axis of rotation. Furthermore, the rotor assembly includes a magnet member that is received within the jacket member. The magnet member includes an outer radial surface facing outwardly from the axis of rotation. The jacket member is made of a sintered composite material having carbon filament and a sintered matrix. Additionally, the inner radial surface of the jacket member abuts against the outer radial surface of the magnet member to retain the magnet member in a radial position relative to the axis.

In another embodiment, a method of manufacturing a rotor assembly for an electric motor of a turbomachine that defines an axis of rotation is disclosed. The method includes providing a magnet member with an outer radial surface facing outwardly from the axis of rotation. The method also includes forming a jacket member from a sintered composite material having carbon filament and a sintered matrix. The jacket member is hollow and defining an inner radial surface facing inwardly toward the axis of rotation. Moreover, the method includes retaining the magnet member within the jacket member with the inner radial surface abutting the outer radial surface to retain the magnet member in a radial position relative to the axis.

In an additional embodiment, a turbomachine is disclosed that includes a housing and a rotating group supported for rotation within the housing about an axis of rotation. The rotating group includes a shaft, a wheel mounted on the shaft, and a rotor assembly mounted on the shaft. The turbomachine also includes an electric motor configured to drive the rotating group in rotation about the axis of rotation. The rotor assembly includes a jacket member that is hollow and that defines an inner radial surface facing inwardly toward the axis of rotation. The rotor assembly also includes a magnet member that is received within the jacket member. The magnet member includes an outer radial surface facing outwardly from the axis of rotation. The jacket member is made of a sintered composite material having carbon filament and a sintered matrix. Also, the inner radial surface of the jacket member abuts against the outer radial surface of the magnet member to retain the magnet member in a radial position relative to the axis.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a well-built, high efficiency permanent magnet electric machine, such as an electric motor, with a rotor assembly that is more robust than conventional rotor assemblies. The rotor assembly may include a jacket member (i.e., sleeve) that retains one or more magnets therein. An inner radial surface of the jacket member may abut against an outer radial surface of the magnet member to radially retain the magnet member and maintain it in a fixed position (e.g., a fixed radial position) relative to the axis and relative to a motor stator member.

The jacket member may be made, constructed from, and/or otherwise include a sintered composite material having carbon filament and a sintered matrix (i.e., a class of composite materials with carbon filament, winding, thread, tape, thread, threading, mat, fiber, etc. that is embedded, attached, or otherwise supported by a sintered matrix material). For example, the sintered composite material may be a carbon-carbon composite material. In some embodiments, the carbon filament and supporting matrix material is sintered to remove organic material from the matrix such that the matrix becomes sintered and organic-free. These materials provide a number of benefits for the jacket member, and, thus, for the overall system (for the rotor assembly, motor, and/or turbomachine). Methods for manufacturing the jacket member from sintered composite materials are also disclosed.

Figure 1:
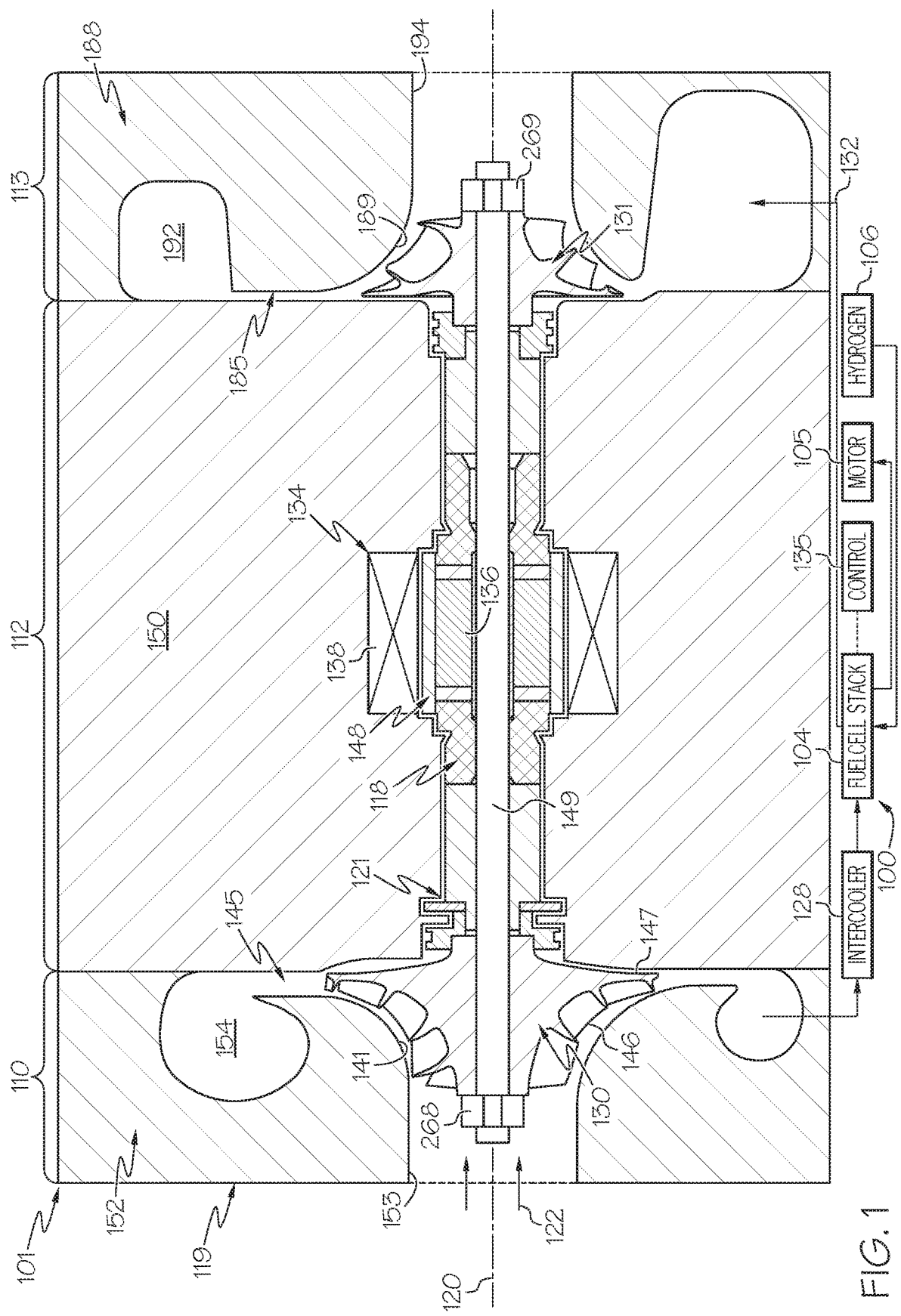
FIG. 1 is schematic illustration of a fuel cell system with a compressor device shown according to example embodiments of the present disclosure.

Referring initially to FIG. 1, a turbomachine 101 is shown according to example embodiments. As shown, the turbomachine 101 generally includes a housing 119 (shown schematically) and a rotating group 118 supported for rotation within the housing 119 about an axis of rotation 120 by one or more bearings 121. In some embodiments, the rotating group 118 and the housing 119 may cooperatively define a compressor section 110 and a turbine section 113. Also, a motor section 112 may be disposed axially between the compressor and turbine sections 110, 113.

The turbomachine 101 may be operatively connected to a fuel cell system 100 and may be configured as an e-charger, electric turbocharger, or other electric motorized compressor device for the fuel cell system 100. However, it will be appreciated that the turbomachine 101 may configured differently from the embodiments shown and that the turbomachine 101 may be incorporated in another system without departing from the scope of the present disclosure. Furthermore, in some embodiments, elements of the motor section 112 may be included in a device other than a turbomachine without departing from the scope of the present disclosure. The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. In some embodiments, the fuel cell system 100 may be included in a vehicle, such as a car, truck, sport utility vehicle, van, motorcycle, etc. Therefore, in some embodiments, the electric motor 105 may convert the electrical power to mechanical power to drive and rotate an axle (and, thus, one or more wheels) of the vehicle. In some embodiments, the electric motor 105 may include the jacket member of the present disclosure that is described below in association with the motor section 112.

Oxygen may be provided to the fuel cell stack 104, at least in part, by the turbomachine 101. More specifically, the motor section 112 may drive rotation of the rotating group 118, and the compressor section 110 may provide a compressed air stream to an intercooler 128 as it flows to the stack 104, and exhaust from the stack 104 may be fed back to the turbine section 113 for providing power assist to the motor section 112. It will be appreciated, however, that other embodiments of the turbomachine 101 fall within the scope of the present disclosure. For example, in some embodiments, the turbine section 113 may be omitted such that the turbomachine 101 includes the motor section 112 as well as the compressor section 110. Additionally, in some embodiments, the turbomachine 101 may include a plurality of sections, such as a plurality of compressor sections that are fluidly connected in succession to include a first (low pressure) stage that feeds a second (high pressure) stage that ultimately feeds the fuel cell system 100. In further embodiments, the turbomachine 101 may be provided in systems other than the fuel cell system 100 without departing from the scope of the present disclosure.

As schematically illustrated in FIG. 1, the housing 119 of the turbomachine 101 may include a compressor housing 152, a motor housing 150, and a turbine housing 188. The compressor housing 152 may define part of the compressor section 110, the motor housing 150 may define part of the motor section 112, and the turbine housing 188 may define part of the turbine section 113. These parts of the housing 119 may be assembled together as detailed below to house the rotating group 118.

The compressor housing 152 may include one or more parts that define an inlet 153 extending along and centered on the axis 120. The compressor housing 152 may also include a convex compressor shroud surface 141 that is positioned in a downstream direction from the inlet 153. The shroud surface 141 may oppose a compressor wheel 130 of the rotating group 118 and may have inverse contour relative thereto. The compressor housing 152 also may include a volute passage 154 that extends about the axis 120 and that is positioned downstream from the shroud surface 141. The volute passage 154 may be fluidly connected to the intercooler 128 for providing fluid flow thereto.

The motor housing 150 may include one or more parts that define a cavity for receiving and housing one or more parts of a motor 134 (e.g., an electric motor). In some embodiments, the motor housing 150 may house and support a motor stator member 138, whereas a motor rotor member 136 may be supported on the rotating group 118. As shown, the stator member 138 may surround the motor rotor member 136 circumferentially about the axis 120; however, in other embodiments, the rotor member 136 may surround the stator member 138. In some embodiments, a shaft 149 of the rotating group 118 may extend axially to operatively connect the rotor member 136 of the motor 134 to the compressor wheel 130 for rotating as a unit.

The compressor housing 152 may be fixed to one axial face of the motor housing 150. As such, the compressor housing 152 may cover over a front side 146 of the compressor wheel 130, and a back side 147 of the compressor wheel 130 may face toward the motor section 112. Furthermore, in some embodiments, the compressor housing 152 and the motor housing 150 may cooperatively define a diffuser area 145 of the flow path of the compressor section 110. The diffuser area 145 may be disposed along the flow path between the compressor wheel 130 and the volute passage 154 (i.e., between the compressor wheel 130 and the volute passage 154).

Additionally, the housing 119 may include the turbine housing 188. The turbine housing 188 may include a circumferential inlet passage 192 that extends about the axis 120. As represented in FIG. 1, the passage 192 may be a volute passage in which the cross sectional area gradually changes as it extends about the axis 120. In other embodiments, the passage 192 may be toroidal such that the cross sectional area remains substantially the same as it extends about the axis 120. The passage 192 may be fluidly connected to the fuel cell stack 104 to receive exhaust therefrom. The turbine housing 188 may also include a convex turbine shroud surface 189 that is positioned in a downstream direction from the circumferential inlet passage 192. The turbine shroud surface 189 may oppose a turbine wheel 131 of the rotating group 118 and may have inverse contour relative thereto. The turbine housing 188 also may include an outlet passage 194 that extends along and that is centered on the axis 120. The outlet passage 194 may be positioned downstream from the turbine shroud surface 189. The turbine housing 188 may be fixed to the axial face of the motor housing 150 that is opposite to the one supporting the compressor housing 152. In some embodiments, the turbine housing 188 and the motor housing 150 may cooperatively define an inlet area 185 of the turbine section 113. The inlet area 185 may be disposed in the flow path of the turbine section 113, positioned downstream of the passage 192 and upstream from the turbine wheel 131 (i.e., between the passage 192 and the turbine wheel 131). The turbine wheel 131 may be fixedly attached to the shaft 149 on the end opposite the compressor wheel 130. As such, the turbine wheel 131 may be operatively attached to the motor 134 and the compressor wheel 130.

The bearing 121 of the turbomachine 101 supports the rotating group 118 (including the compressor wheel 130 and the turbine wheel 131) for rotation within the housing 119. The bearing 121 may have various configurations without departing from the scope of the present disclosure. In the illustrated embodiment, the bearing 121 is an air bearing. However, it will be appreciated that the bearing 121 may include roller elements or may be configured otherwise. The bearing may 121 also include an oil-fed journal bearing of various architectures (e.g., fully floating, semi-floating, split, coupled, etc.). Moreover, the bearing 121 may include an oil-fed rolling element bearing in some embodiments.

During operation of the turbomachine 101, an inlet airstream (represented by arrows 122 in FIG. 1) may flow into the inlet 153, and the inlet airstream 122 may be compressed as it flows downstream between the compressor wheel 130 and the shroud surface 141, through the diffuser area 145, and into the volute passage 154. A compressed airstream (represented by arrow 124) may exit the volute passage 154 and may be directed to the intercooler 128 and then to the fuel cell stack 104 for boosting the operating efficiency of the fuel cell system 100. Furthermore, in some embodiments, an exhaust gas stream (represented by arrow 132) from the fuel cell stack 104 may be directed back toward the turbomachine 101 and received by the passage 192 of the turbine section 113. The exhaust gas stream 132 may flow through the inlet area 185 to the turbine wheel 131 and may drive rotation of the turbine wheel 131 before flowing to the outlet passage 194. Mechanical power from the turbine section 113 may be converted to electrical power for the motor 134 for ultimately assisting in rotation of the compressor wheel 130.

Various components of the fuel cell system 100 and/or the turbomachine 101 may be controlled by a control system 135. The control system 135 may be a computerized system with a processor, various sensors, and other components for electrically controlling operation of the motor 134, the fuel cell stack 104, and/or other features of the system 100. In some embodiments, the control system 135 may define or may be part of the electrical control unit (ECU) of a vehicle.

Referring now to FIGS. 1 and 2, the rotating group 118 will be discussed in greater detail. As shown, the rotating group 118 may include a rotor assembly 148. Generally, the rotor assembly 148 may be an elongate, cylindrical member that includes one or more features of the motor rotor member 136. The rotor assembly 148 may be fixedly received on the shaft 149 as shown in FIG. 1. As such, the shaft 149 may extend continuously through the rotor assembly 148 and may project axially from both ends of the rotor assembly 148. In other embodiments, the shaft 149 may be discontinuous so as to include a first segment that extends axially from one end of the rotor assembly 148 and a separate second segment that extends axially from the opposite end of the rotor assembly 148. The rotor assembly 148 may be positioned on the shaft 149 to be received within the motor stator member 138 and the motor housing 150.

Figure 2A:
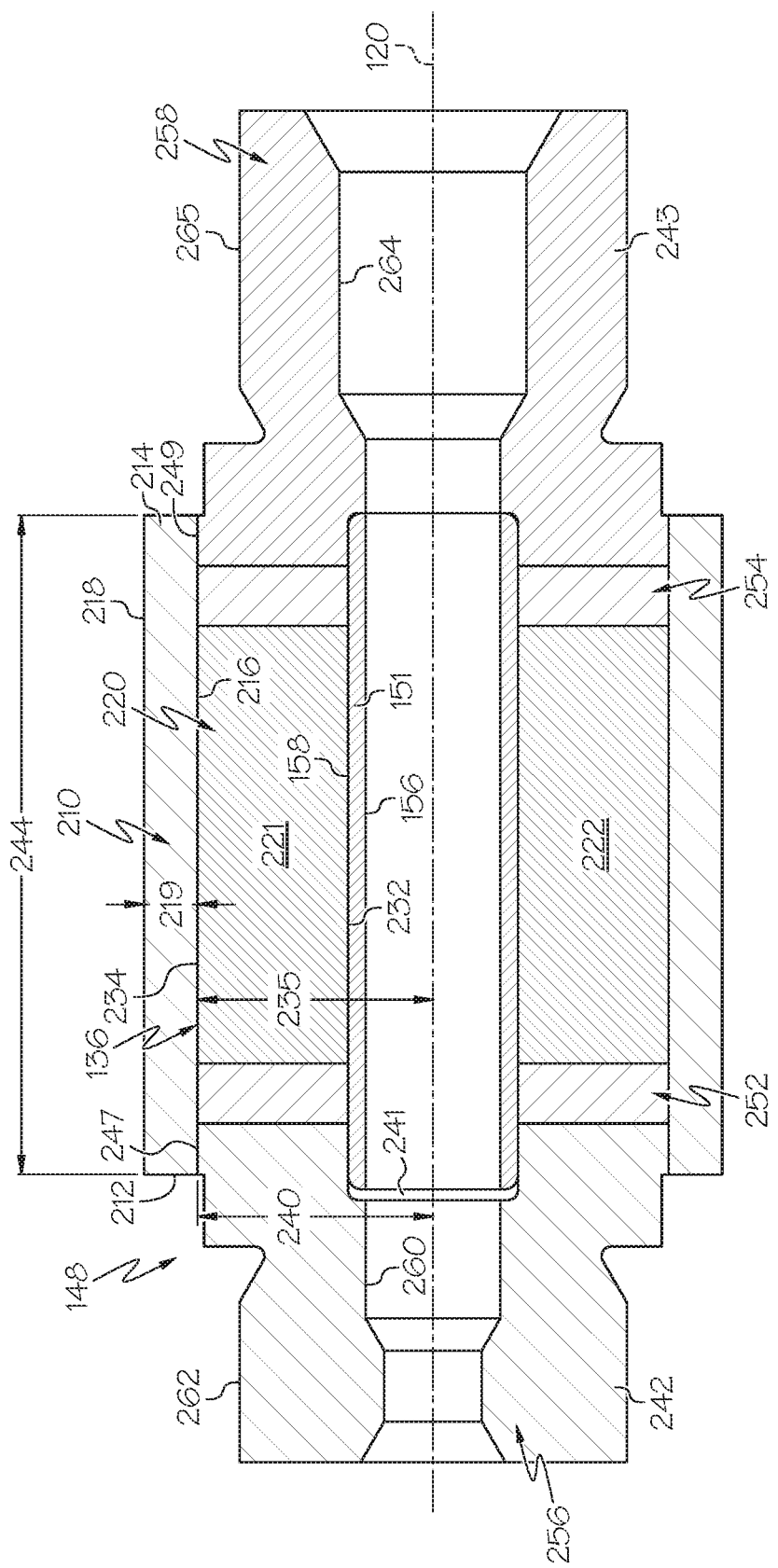
FIG. 2A is an axial section view of a rotor assembly of the compressor device of FIG. 1.

As shown in FIG. 2A, the rotor assembly 148 may include an inner core 151 (i.e., an inner member, an inner cylinder, etc.) in some embodiments. The inner core 151 may be elongate and cylindrical. In some embodiments, the inner core 151 may be hollow, but in other embodiments, the inner core 151 may have a solid cross section. The inner core 151 may be open at both axial ends as shown in FIG. 2A. In some embodiments, the inner core 151 may be centered on the axis 120 and may extend continuously and annularly in a circumferential direction about the axis 120. The inner core 151 may define an inner radial surface 156 and an outer radial surface 158. In some embodiments represented in FIG. 2A, the outer radial surface 158 of the inner core 151 may be rounded (e.g., circular). In other embodiments represented in FIGS. 2B and 2C, at least part of the outer radial surface 158', 158" of the inner core 151', 151" may have one or more flat sides so as to define a square, hexagonal, or other polygonal cross section. Referring back to the circular and cylindrical inner core 151 of FIG. 2A, the radii of the inner and outer diameter surfaces 156, 158 may remain substantially constant along the axial length of the inner core 151. Furthermore, in some embodiments, the inner core 151 may be made from a strong, lightweight, ferromagnetic material, such as steel. The inner core 151 may be fixedly attached to the shaft 149. For example, the inner diameter surface 156 may abut against the outer diameter surface of the shaft 149. In some embodiments, the inner core 151 may be pressed on and may be fixed to the shaft 149 via a radial interference fit. It will be appreciated that the inner core 151 may be an inner member that is shaped differently, for example, to include a plurality of arcuate parts that collectively extend about the axis 120.

Figure 2C:
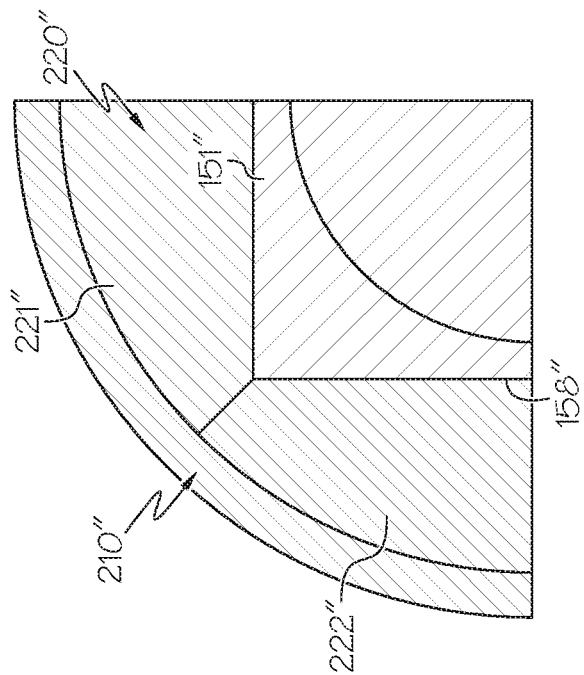
FIG. 2C is a cross-sectional view of the rotor assembly according to additional embodiments.
Figure 2B:
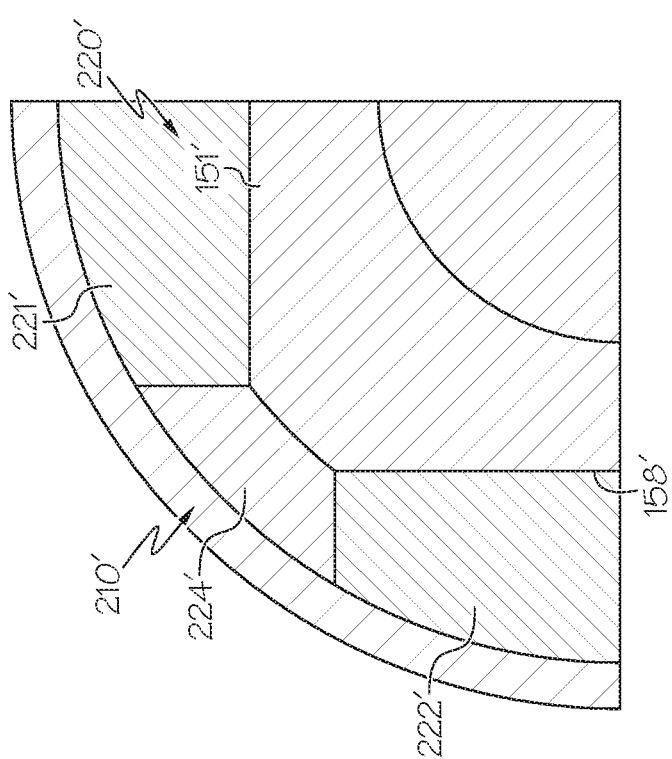
FIG. 2B is a cross-sectional view of the rotor assembly according to additional embodiments.

The rotor assembly 148 may further include at least one magnet member 220. In some embodiments, the magnet member 220 may be substantially cylindrical, hollow, and open at both ends. The magnet member 220 may be centered on the axis 120. The magnet member 220 may comprise and/or include a plurality of arcuate segments that are constructed from and that include a permanent magnet. In some embodiments, for example, the magnet member 220 includes a first magnet segment 221 and a second magnet segment 222. The first and second magnet segments 221, 222 may be arcuate (e.g., semi-circular) and arranged about the axis 120 at different angular positions (e.g., spaced one hundred eighty degrees (180°) apart). The first and second magnet segments 221, 222 may, in some embodiments, be arranged end-to-end to collectively extend circumferentially about the axis 120. The segment 221, 222 of the magnet members may operate in tandem with the motor stator member 138 for operation of the motor 134 and for drivingly rotating the rotating group 118. It will be appreciated that one or both segments 221, 222 may be referred to individually and collectively as magnet members. In additional embodiments, the magnet member 220 may include a single, cylindrical, hollow magnet that extends annularly and continuously about the axis 120. Furthermore, the rotor assembly 148 may include other configurations of magnet members and/or magnet segments. As shown in the embodiments of FIG. 2B and 2C, for example, the segments 221', 222', 221", 222" that are shown may be two of four magnet segments that are spaced ninety degrees)(90° apart, etc. The magnet member may include additional segments (e.g., more than four) that are spaced equidistantly apart without departing from the scope of the present disclosure. Moreover, as shown in FIG. 2B, the magnet member 220' may include one or more spacers 224' that are made from nonmagnetic material and that are disposed circumferentially between neighboring segments 221', 222'. The spacer 224' and the segments 221', 222' may include corresponding flat surfaces that abut against each other in the circumferential or tangential direction. In additional embodiments represented in FIG. 2C, the segments 221", 222" include corresponding flat surfaces that abut against each other in the circumferential or tangential direction.

Referring back to FIG. 2A, the magnet member 220 may define an inner radial surface 232 and an outer radial surface 234. In some embodiments, the first and second magnet segments 221, 222 may define respective circumferential portions of the inner and/or outer radial surfaces 232, 234. (In the embodiment of FIG. 2B, the spacer 224' may partly define the outer radial surface.) As shown in FIG. 2A, the outer radial surface 234 may define an outer radius 235 (outer radial dimension) with respect to the axis 120. The outer radius 235 may remain substantially constant along the axial length of the magnet member 220. The inner radial surface 232 may similarly define an inner radius that remains substantially constant along the axial length of the magnet member 220. Accordingly, the magnet member 220 may resemble a hollow right cylinder. The magnet member 220 may receive the inner core 151 and may be fixedly attached thereto. For example, the inner radial surface 232 may abut against the outer radial surface 158 of the inner core 151. In some embodiments, the magnet member 220 may be fixed to the inner core 151 at least partly via adhesives, one or more weldments, etc. In additional embodiments, the magnet member 220 may be fixed to the inner core 151 via a radial interference fit (e.g., such that the outer radial surface 158 is slightly oversize and the inner radial surface 232 is slightly undersize with these surfaces pressed together to provide the radial interference fit). The first and second magnet segments 221, 222 may be made from and/or include sintered Samarium-Cobalt, Neodymium-Iron-Boron, Aluminum-Nickel-Cobalt or similar magnetic materials.

Furthermore, in some embodiments, the rotor assembly 148 may include a first spacer 252 and a second spacer 254 (i.e., first and second axial end plates). The first and second spacers 252, 254 may be annular and disc-shaped. The spacers 252, 254 may be made of a non-magnetic material, such as aluminum-bronze material. The first spacer 252 may abut axially against one end of the magnet member 220. The second spacer 254 may abut axially against the opposite end of the magnet member 220. The first and second spacers 252, 254 may provide axial support for the magnet member 220. Also, because of their non-magnetic property, the spacers 252, 254 do not interfere with the magnetic field of the magnet member 220.

Moreover, the rotor assembly 148 may include a first projecting end 256. The first projecting end 256 may be hollow and cylindrical so as to include an inner surface 260 and an outer surface 262. The first and second projecting ends 256, 258 may be formed from steel in some embodiments. The radii of the inner and outer surfaces 260, 262 may vary along the axial length of the first projecting end 256. The features of the inner surface 260 may be formed according to opposing features of the shaft 149. One end of the outer surface 262 may define a seat surface 247. The seat surface 247 may define the largest diameter of the outer surface 262. The diameter of the seat surface 247 may be substantially the same as the outer diameters of the first spacer 252, the magnet member 220, and the second spacer 254 such that these surfaces are substantially even and flush in the axial direction. (In the embodiment of FIG. 2B, the spacer 224' may similarly include a flush outer radial surface.) Additionally, as shown in FIG. 2A, one end of the first projecting end 256 may abut axially against the first spacer 252. Additionally, the first projecting end 256 may receive one end of the inner core 151 with an axial gap 241 defined therebetween. The first projecting end 256 may also define a free end 242 that extends axially away from the first spacer 252 and the magnet member 220.

In addition, the rotor assembly 148 may include a second projecting end 258. The second projecting end 258 may be hollow and cylindrical so as to include an inner surface 264 and an outer surface 265. The radii of the inner and outer surfaces 264, 265 may vary along the axial length of the second projecting end 258. One end of the outer surface 265 may define a seat surface 249. The seat surface 249 may define the largest diameter of the outer surface 265. The diameter of the seat surface 249 may be substantially the same as the outer diameters of the first spacer 252, the magnet member 220, the second spacer 254, and the other seat surface 247 such that these surfaces are substantially even and flush in the axial direction. (In the embodiment of FIG. 2B, the spacer 224' may similarly include a flush outer radial surface.) Additionally, as shown in FIG. 2A, the second projecting end 258 may receive a respective end of the inner core 151. The second projecting end 258 may also define a free end 243 that extends axially away from the second spacer 254 and the magnet member 220.

The first and second projecting ends 256, 258, the spacers 252, 254, the magnet member 220, and the inner core 151 may be stacked up and arranged axially with the shaft 149 extending axially through each. In some embodiments, a fastener arrangement may compress the first and second projecting ends 256, 258 toward each other, thereby providing a compressive load directed centrally toward the magnet member 220. As shown in FIG. 1, the rotating group 118 may include members stacked axially on the shaft 149, and first and second fasteners 268, 269 (e.g., first and second nuts) may be attached (e.g., threadably attached) on respective axial ends of the shaft 149. As such, the magnet member 220 is retained in a fixed axial position. In other embodiments, the rotating group 118 may include only one nut threadably attached at one end, and the shaft 149 may include a fixed, bulbous head (e.g., like a bolt head) at the opposite end.

The rotor assembly 148 may further include a jacket member 210. The jacket member 210 provides a number of advantages as discussed herein. Although the jacket member 210 in the discussed embodiments is included in the electric motor 134, it will be appreciated that the jacket member 210 (and the other related features of the motor 134) may instead be included in the motor 105, another electric motor, or another electric machine (e.g., an electric generator) without departing from the scope of the present disclosure. Furthermore, the jacket member 210 and other components described herein may be included in another turbomachine (other than a compressor device) without departing from the scope of the present disclosure.

The jacket member 210 may be a unitary, one-piece, arcuate member. In some embodiments, the jacket member 210 may be a hollow and cylindrical tube. The jacket member 210 may be centered about the axis 120. The jacket member 210 may be open at both a first axial end 212 and a second axial end 214. An axial length 244 of the jacket member 210 is measured from the first axial end 212 to the second axial end 214. The jacket member 210 may also include an inner radial surface 216 that faces inwardly toward the axis 120. The jacket member 210 may also include an outer radial surface 218 that faces outward radially from the axis 120. The inner and/or outer radial surfaces 216, 218 may be smooth and circumferentially continuous in some embodiments. The inner radial surface 216 may define an inner radial dimension 240 relative to the axis 120. The inner radial dimension 240 may be continuous and constant for a majority of the axial length 244 of the jacket member 210. For example, in some embodiments, the inner radial dimension 240 may remain substantially constant along the axial length 244 of the jacket member 210 (e.g., except for one or more chamfered edges at the ends 212, 214). The radius of the outer radial surface 218 may also remain substantially constant along the axial length 244 such that a wall thickness 219 (measured between the inner and outer radial surfaces 216, 218) of the jacket member 210 remains substantially constant along a majority (substantially all) of the length 244. Also, the inner radial surface 216 may define a central bore 217 extending axially through the jacket member 210 from the first axial end 212 to the second axial end 214.

The bore 217 of the jacket member 210 may receive the magnet member 220, the first and second spacers 252, 254, and the first and second projecting ends 256, 258, and the jacket member 210 may be fixedly attached or fastened thereto. As such, the jacket member 210, the magnet member 220, the first and second spacers 252, 254, and the first and second projecting ends 256, 258 may be fixed together for rotation as a unit.

The inner radial surface 216 of the jacket member 210 may abut against the outer diameter surfaces of the first and second spacers 252, 254 such that the spacers 252, 254 are compressed radially between the jacket member 210 and the inner core 151. Furthermore, the inner radial surface 216 of the jacket member 210 may abut against the seat surface 247 of the first projecting end 256 and the seat surface 249 of the second projecting end 258. As such, the first projecting end 256 and the second projecting end 258 may be radially compressed between the jacket member 210 and the inner core 151.

Moreover, the inner radial surface 216 may abut against the outer radial surface 234 of the magnet member 220. As such, the first and second magnet segments 221, 222 of the magnet member 220 may be compressed radially between the jacket member 210 and the inner core 151. In other words, the magnet member 220 may be disposed radially between the jacket member 210 and the inner core 151 such that the jacket member 210 and the inner core 151 cooperatively apply a radial compression load to the magnet member 220. The jacket member 210 may be sized, however, to maintain the compressive load on the magnet member 220 below its compressive yield strength. The jacket member 210 may maintain contact pressure (pre-load) on the magnet member 220 to retain it in fixed radial position and to transmit torque through the rotor assembly 148. (In the embodiment of FIG. 2B, the jacket member 210' may similarly abut against the outer radial surface of the spacer 224' as well as the magnet segments 221', 222' and provide a radial compressive load collectively to these components.)

The radius 240 may be slightly undersize as compared to the slightly oversized radius 235 (i.e., the radius 240 may be slightly less than the radius 235) such that these surfaces are compressed together to provide a radial interference fit. The spacers 252, 254 and the projecting ends 256, 258 may be similarly fixed to the inner radial surface 216 of the jacket member 210 via an interference fit. In addition, in some embodiments, the jacket member 210 may be adhesively bonded, welded, or otherwise fixed to the projecting ends 256, 258.

Accordingly, the jacket member 210 may serve to provide support for the segments 221, 222 of the magnet member 220, the spacers 252, 254, and the projecting ends 256, 258 to prevent loosening, detachment, radial shifting, vibration, or other movements of these components. Thus, the rotor assembly 148 may operate at a large range of rotational speeds for long periods of time and a long overall operating lifetime.

The jacket member 210 may be formed from a material that provides a number of benefits. The material can exhibit high strength and stiffness so that the jacket member 210 provides robust support. Moreover, the material may have relatively low density. Accordingly, the jacket member 210 may be relatively lightweight and compact without negatively affecting operation of the turbomachine 101.

For example, in some embodiments, the jacket member 210 may include and/or comprise a fiber reinforced composite, such as a sintered composite material having carbon filament and a sintered matrix material supporting the filament. In some embodiments, the jacket member 210 may include and/or comprise a carbon-carbon composite material. As such, the jacket member 210 may be made from a composite material consisting of carbon fiber, filament, tape, etc. that is embedded within a matrix of carbon material (e.g., graphite). In other embodiments, the sintered composite material of the jacket member 210 including the carbon filament and matrix are sintered and exposed to high heat to remove organic materials; accordingly, the remaining material of the jacket member 210 may include carbon filament and an organic-free matrix that supports the filament.

Moreover, the carbon-carbon composite material of the jacket member 210 is nonmagnetic. Thus, the jacket member 210 may be in close proximity to the rotor member 136 without adversely affecting the electromagnetic field of the motor 134.

The jacket member 210 may also provide thermal benefits for the rotor assembly 148. For example, the carbon-carbon composite material may allow the jacket member 210 to withstand high temperature operation. Furthermore, the thermal expansion characteristics of the material may be well suited for the jacket member 210 to provide robust support. The composite material of the jacket member 210 may be configured to withstand operating and hot soak-back temperatures.

Figure 3:
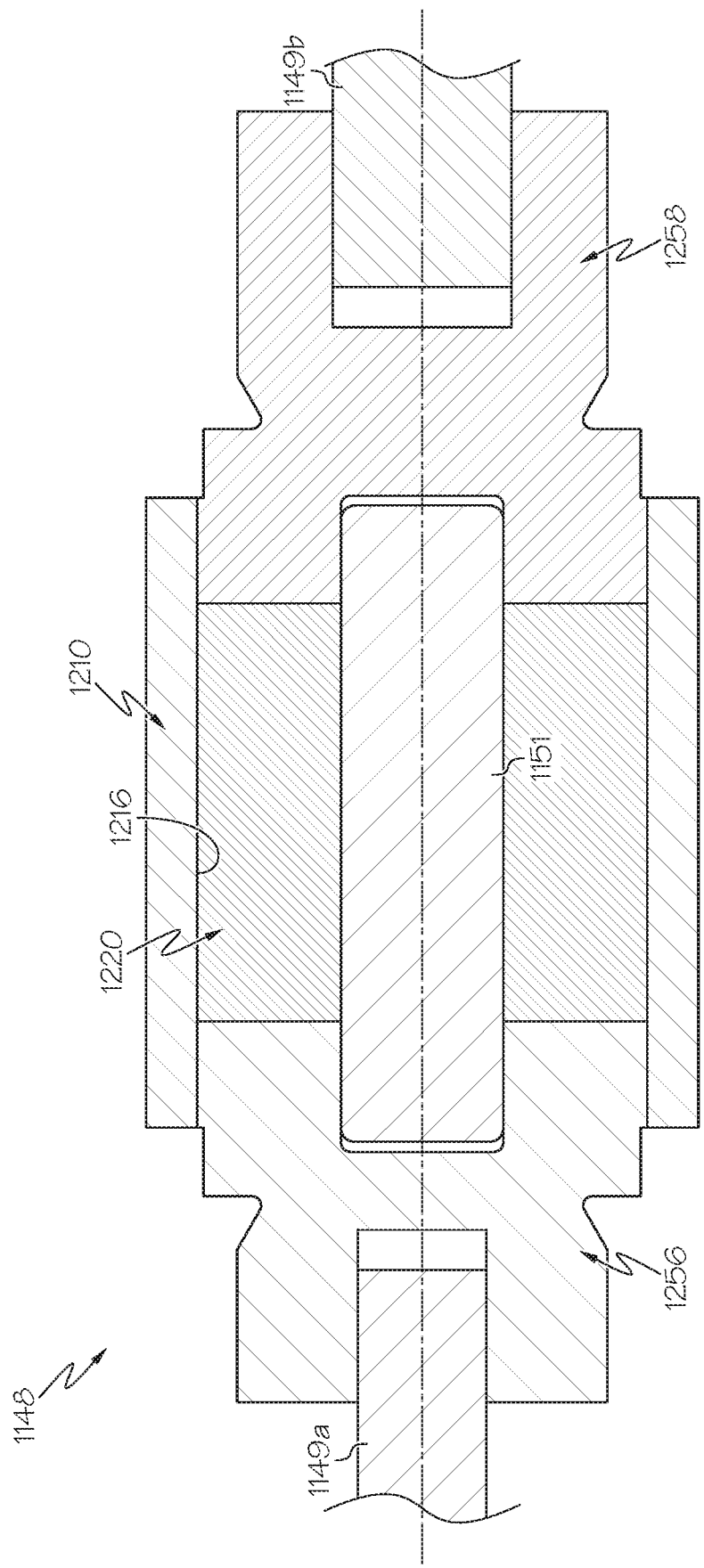
FIG. 3 is an axial section view of the rotor assembly according to additional embodiments of the present disclosure.

FIG. 3 illustrates additional embodiments of the rotor assembly 1148. The rotor assembly 1148 may be substantially similar to the embodiment of FIG. 2A except as noted. Accordingly, components that correspond are indicated with corresponding reference numbers increased by 1000. As shown, the inner core 1151 may have a solid cross section instead of being hollow like the inner core 151 of FIG. 2A. Also, the first and second projecting ends 1256, 1258 may abut axially against respective axial ends of the magnet member 1220. Moreover, the first and second projecting ends 1256, 1258 may receive respective ends of the inner core 1151. Additionally, the inner radial surface 1216 of the jacket member 1210 may receive and may abut radially against the first and second projecting ends 1256, 1258 and the magnet member 1220. Furthermore, instead of a continuous elongate shaft 149 of the type shown in FIG. 1, there may be a first shaft segment 1149*a* that is received within and fixed to the first projecting end 1256 and a second shaft segment 1149*b* that is received within and fixed to the second projecting end 1258.

Figure 4:
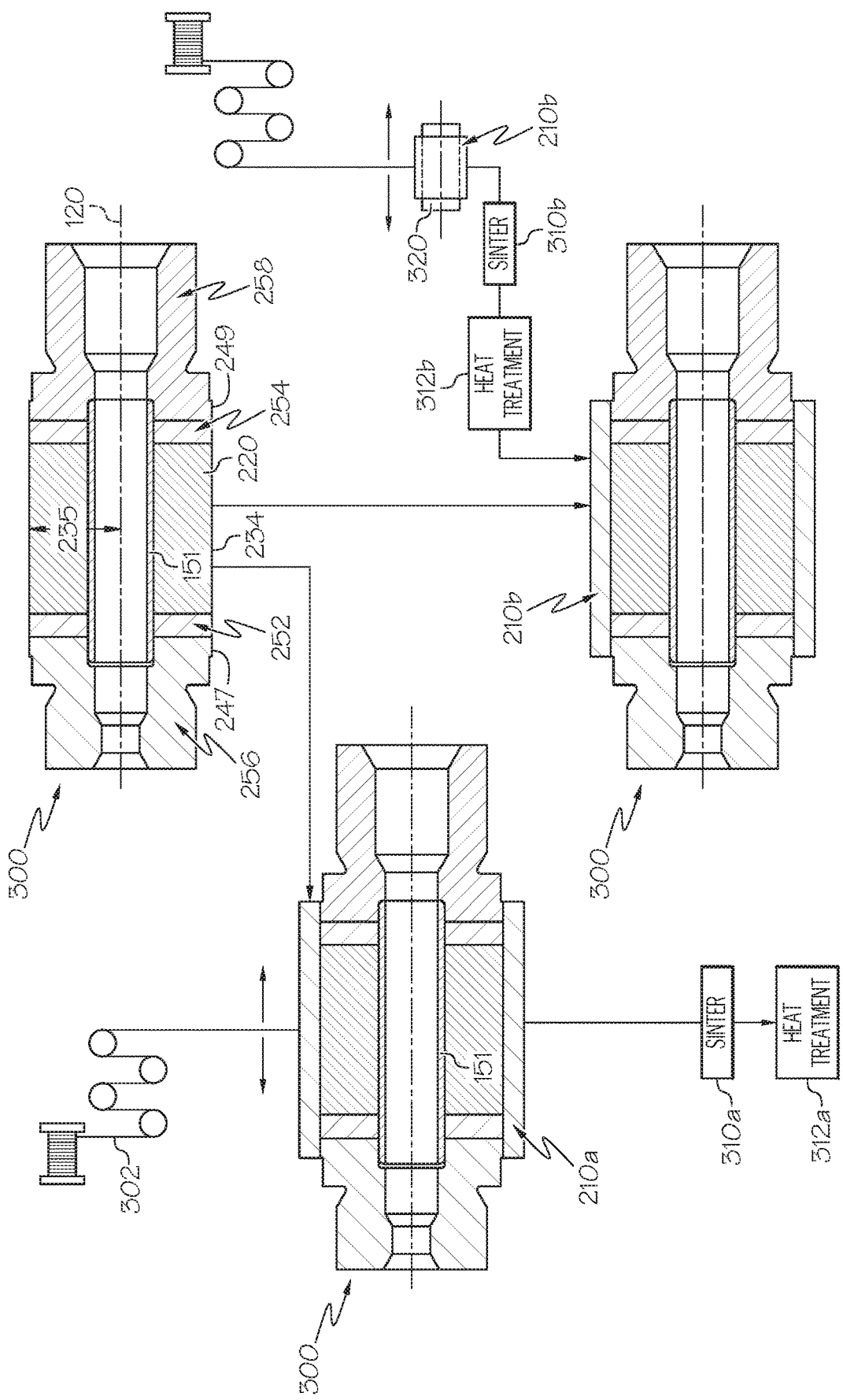
FIG. 4 is a schematic view of methods of manufacturing the rotor assembly of the present disclosure.

Referring now to FIG. 4, methods for manufacturing the jacket member 210 and the rotor assembly 148 are illustrated according to various example embodiments. The methods are illustrated in relation to the embodiment of FIG. 2A; however, it will be appreciated that the methods may be applied to the embodiments of FIGS. 2B, 2C, and 3 or applied to other configurations without departing from the scope of the present disclosure.

In some embodiments, the method may begin by providing a stack-up 300 that includes the inner core 151, the magnet member 220, the first and second spacers 252, 254, and the first and second projecting ends 256, 258. Furthermore, the stack-up 300 may include the spacer 224' and magnet segments 221', 222' of FIG. 2B; the stack-up 300 may include the magnet segments 221", 222" of FIG. 2C; or the stack-up 300 may include the inner core 1151, the magnet member 1220, and the first and second projecting ends 1256, 1258 of FIG. 3. As represented in FIG. 4, the stack-up 300 may include these components arranged along the axis 120 as discussed above. Furthermore, the outer radial surface 234, the outer diameter surfaces of the spacers 252, 254, and the first and second seat surfaces 247, 249 may be machined (e.g., ground, polished, or otherwise conditioned) to make these surfaces flush and even along the axis 120 and to bring these surfaces to the predetermined outer radius 235. These components may be adhesively attached in some embodiments to hold the stack-up 300 together during this process.

Next, in some embodiments, a pre-form (i.e., pre-sintered) jacket member 210*a* may be laid-up directly on the stack-up 300 (i.e., laid-up "in situ" on the stack-up 300). For example, a precured filament 302 (e.g., a carbon filament 302 pre-impregnated with precured matrix material) may be wound directly over the magnet member 220, the spacers 252, 254, and the seat surfaces 247, 249 of the stack-up 300. Accordingly, the jacket member 210*a* may be formed to correspond to the outer radial surface 234. The filament 302 may be laid-up and surrounded by an organic matrix material (binder) such as plastic or pitch. In some embodiments, coke or another fine carbon aggregate is added to the matrix. In some embodiments, the first and second projecting ends 256, 258 may include hooks for hooking onto the filament 302 for winding and laying-up the jacket member 210*a* onto the stack-up 300. A predetermined amount of tension may be applied to the filament 302 during this process such that the filament 302 applies a predetermined pre-load to the stack-up 300. Also, the filament 302 may be laid-up over the stack-up 300 so as to extend in various predetermined directions to provide load bearing capability in a predetermined manner. For example, the filament 302 may laid-up in the circumferential direction, for example, to provide hoop strength to the assembly. At least one segment of the filament 302 may also be laid-up in the axial direction to increase the bending strength of the jacket member 210*a*. The filament 302 may be layered with different layers having different orientations of the filament 302.

Then, the pre-form jacket member 210*a* may be cured and sintered while supported on the stack-up 300. The jacket member 210*a* may be heated, for example, in a sintering oven 310*a*, so that pyrolysis transforms the matrix to relatively pure carbon (i.e., organic material leaves the matrix material). In some embodiments, the volume of the matrix material reduces, which may create voids. The voids may be filled by introducing a carbon-forming gas such as acetylene through the jacket member 210*a* in a heat treatment environment 312*a*. The heat treatment environment 312*a* may allow the carbon to form into larger graphite crystals.

FIG. 4 also illustrates an alternative embodiment in which a pre-form jacket member 210*b* is laid-up over a cylindrical mandrel 320. The mandrel 320 may have an outer diameter that corresponds to the outer radius 235 of the stack-up 300. Similar to the embodiment discussed above, the precured filament 302 may be wound circumferentially and/or axially with a predetermined amount of applied tension. Next, the pre-form jacket member 210*b* may be sintered in the oven 310*b* and heat treated in the heat treatment environment 312*b* while supported on the mandrel 320. Once formed, the jacket member 210*b* may be removed from the mandrel 320 and attached to the stack-up 300. In some embodiments, a press is used to advance the jacket member 210*b* over the stack-up 300.

These manufacturing techniques may be configured according to certain considerations. For example, the jacket members 210*a*, 210*b* may experience a known amount of shrinkage during the sintering process and/or during other processes. The dimensions and features of the jacket members 210*a*, 210*b* may be configured to accommodate for this shrinkage.

It will be appreciated that the material of the magnet member 220 may be chosen particularly for use in combination with the sintered carbon composite jacket member 210. For example, the magnet member 220 may be made from sintered Samarium-Cobalt magnetic material so as to withstand the sintering process in the sintering oven 310*a*.

It will also be appreciated that the sintering of the composite material of the jacket member 210 increases the thermal capability of the jacket member 210. Accordingly, in addition to the advantages discussed above, the jacket member 210 of the present disclosure may be used in high-temperature conditions. The sintering process also reduces chemical sensitivity of the jacket member 210. Thus, in addition to the advantages discussed above, the jacket member 210 may be exposed to harsh chemicals (e.g., products of combustion, coolant, etc.) without adversely affecting operations, and the jacket member 210 may provide chemical protection to other components of the rotor assembly 148.

Once sintered and heat treated, then the rotor assembly 148 may be attached to the shaft 149. Then, the rotor assembly 148 may be positioned with the rest of the rotating group 118 in the housing 119 as discussed above. Thus, manufacture of the jacket member 210*a*, 210*b*, the rotor assembly 148 and the other portions of the turbomachine can be completed efficiently, repeatably, and accurately.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A rotor assembly for an electric motor of a turbomachine that defines an axis of rotation comprising:
   a jacket member that is hollow and that defines an inner radial surface facing inwardly toward the axis of rotation;
   a magnet member that is received within the jacket member, the magnet member including an outer radial surface facing outwardly from the axis of rotation;
   the jacket member made of a sintered composite material having carbon filament and a sintered matrix;
   the inner radial surface of the jacket member abutting against the outer radial surface of the magnet member to retain the magnet member in a radial position relative to the axis; and
   wherein the sintered composite material is a carbon-carbon composite material.

2. The rotor assembly of claim 1, wherein the jacket member has a first end and a second end and an axial length measured between the first end and the second end;
   wherein the inner radial surface has a radius that is continuously constant for a majority of the axial length of the jacket member.

3. The rotor assembly of claim 1, wherein the inner radial surface defines an inner radius, wherein the outer radial surface defines an outer radius, and wherein the inner radius is less than the outer radius to define a radial interference fit between the jacket member and the magnet member.

4. The rotor assembly of claim 1, further comprising an inner member that is received within the jacket member;
   wherein the magnet member is disposed radially between the jacket member and the inner member with the jacket member and the inner member cooperatively applying a radial compression load to the magnet member.

5. The rotor assembly of claim 1, further comprising a projecting end that is partly received within the jacket member and that projects axially away from the jacket member;
   wherein the projecting end abuts axially against the magnet member; and
   wherein the first projecting end and the second projecting end include respective outer diameter surfaces that are flush and even with the outer radial surface of the magnet member and that abut against the inner radial surface of the jacket member.

6. The rotor assembly of claim 1, further comprising a first projecting end, a first spacer, a second projecting end, and a second spacer that are received within the jacket member;
   wherein the first spacer is disposed axially between the first projecting end and the magnet member;
   wherein the second spacer is disposed axially between the second projecting end and the magnet member;
   wherein the first projecting end and the second projecting end project axially from the jacket member; and
   wherein the first projecting end, the first spacer, the second spacer, and the second projecting end include respective outer diameter surfaces that are flush and even with the outer radial surface of the magnet member and that abut against the inner radial surface of the jacket member.

7. The rotor assembly of claim 1, wherein the jacket member has a first end, a second end, and an axial length measured between the first end and the second end;
   wherein the jacket member is cylindrical and hollow;
   wherein the jacket member includes an outer surface;
   wherein the jacket member defines a wall thickness measured between the inner radial surface and the outer surface; and
   wherein the wall thickness is constant along a majority of the axial length.

8. The rotor assembly of claim 1, wherein the jacket member is received within a motor stator member of the electric motor for rotation within the motor stator member.

9. A method of manufacturing a rotor assembly for an electric motor of a turbomachine that defines an axis of rotation comprising:
   providing a magnet member with an outer radial surface facing outwardly from the axis of rotation;
   forming a jacket member from a sintered composite material having carbon filament and a sintered matrix, including sintering the composite material to form a carbon-carbon composite material of the jacket member, the jacket member being hollow and defining an inner radial surface facing inwardly toward the axis of rotation; and
   retaining the magnet member within the jacket member with the inner radial surface abutting the outer radial surface to retain the magnet member in a radial position relative to the axis.

10. The method of claim 9, wherein forming the jacket member includes laying up the carbon filament and an un-sintered matrix material into a pre-sintered composite structure; and
    sintering the pre-sintered composite structure to form the sintered composite material.

11. The method of claim 10, further comprising laying up the carbon filament and the un-sintered matrix material to form the pre-sintered composite structure over the magnet member; and
    wherein sintering the pre-sintered composite structure includes sintering the pre-sintered composite structure while over the magnet member.

12. The method of claim 10, further comprising laying up the carbon filament and the un-sintered matrix material to form the pre-sintered composite structure over a mandrel; and
    wherein sintering the pre-sintered composite structure includes sintering the pre-sintered composite structure while over the mandrel.

13. The method of claim 10, wherein forming the jacket member includes laying up at least one segment of the precure filament in the axial direction along the axis.

14. The method of claim 9, further comprising providing the magnet member axially between a first projecting end and a second projecting end; and
    further comprising retaining the magnet member and the first and second projecting ends within the jacket member with the first and second projecting ends partly projecting from the jacket member.

15. The method of claim 14, further comprising creating respective outer diameter surfaces of the first projecting end and the second projecting end that are flush and even with the outer radial surface of the magnet member.

16. A turbomachine comprising:
    a housing;
    a rotating group supported for rotation within the housing about an axis of rotation, the rotating group including a shaft, a wheel mounted on the shaft, and a rotor assembly mounted on the shaft;
    an electric motor configured to drive the rotating group in rotation about the axis of rotation;

wherein the rotor assembly comprises:
a jacket member that is hollow and that defines an inner radial surface facing inwardly toward the axis of rotation, the jacket member having a first end, a second end, and an axial length measured between the first end and the second end, the inner radial surface having an inner radius that is continuously constant for a majority of the axial length of the jacket member;
a magnet member that is received within the jacket member, the magnet member including an outer radial surface facing outwardly from the axis of rotation;
an inner member that is received within the jacket member, the inner member including an outer core surface that remains substantially constant along an axial length of the inner member, the magnet member being disposed radially between the jacket member and the outer core surface of the inner member with the jacket member and the inner member cooperatively applying a radial compression load to the magnet member;
the jacket member made of a carbon-carbon composite material having carbon filament and a sintered organic-free carbon matrix; and
the inner radial surface of the jacket member abutting against the outer radial surface of the magnet member to retain the magnet member in a radial position relative to the axis.

17. The turbomachine of claim 16, wherein the inner radial surface defines an inner radius, wherein the outer radial surface defines an outer radius, and wherein the inner radius is less than the outer radius to define a radial interference fit between the jacket member and the magnet member.

18. The turbomachine of claim 16, wherein the outer core surface includes at least one flat side.

* * * * *